United States Patent
Tsai et al.

(10) Patent No.: US 10,841,926 B2
(45) Date of Patent: Nov. 17, 2020

(54) DEFAULT BEAM FOR UPLINK TRANSMISSION AFTER CONNECTION REESTABLISHMENT

(71) Applicant: MEDIATEK INC., Hsin-Chu (TW)

(72) Inventors: Cheng-Rung Tsai, Hsin-Chu (TW);
Ming-Po Chang, Hsin-Chu (TW);
Chia-Hao Yu, Hsin-Chu (TW);
Weidong Yang, San Jose, CA (US);
Jiann-Ching Guey, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/282,821

(22) Filed: Feb. 22, 2019

(65) Prior Publication Data
US 2019/0268961 A1   Aug. 29, 2019

Related U.S. Application Data

(60) Provisional application No. 62/634,792, filed on Feb. 23, 2018.

(51) Int. Cl.
*H04W 72/04* (2009.01)
*H04W 74/08* (2009.01)
(Continued)

(52) U.S. Cl.
CPC ........ *H04W 72/046* (2013.01); *H04B 7/0695* (2013.01); *H04B 7/088* (2013.01);
(Continued)

(58) Field of Classification Search
CPC .......... H04W 72/046; H04W 74/0833; H04W 76/19; H04B 7/0695; H04B 7/088
See application file for complete search history.

(56) References Cited

U.S. PATENT DOCUMENTS

2015/0049600 A1   2/2015  Balasubramanian et al. ............... 370/216
2015/0173120 A1   6/2015  Yamada ........................ 370/331
(Continued)

FOREIGN PATENT DOCUMENTS

WO    WO2017151876 A1    3/2016

OTHER PUBLICATIONS

AT&T; "Remaining Details on Mechnaisms to Recover form Beam Failure"; R1-1719633; 3GPP TSG RAN WG1 Meeting 91 Reno, USA, Nov. 27-Dec. 1, 2017 (Year: 2017).*

(Continued)

*Primary Examiner* — Gary Mui
(74) *Attorney, Agent, or Firm* — Imperium Patent Works; Zheng Jin

(57) ABSTRACT

A method of default uplink beam determination after radio resource control (RRC) connection reestablishment in a beamforming system is proposed. For uplink (UL) transmission, the BS provides dedicated physical uplink control channel (PUCCH) resource configuration to UE. The configuration includes spatial relation information that indicates the spatial domain transmission filter to be used by UE for the corresponding PUCCH transmission. After RRC connection re-establishment and before a dedicated PUCCH configuration is received, a default UE TX beam can be determined based on the UE TX beam used during the RRC connection re-establishment procedure, e.g., the UE TX beam used to transmit MSG3 in a four-step random-access channel (RACH) procedure triggered by the RRC connection re-establishment procedure.

16 Claims, 3 Drawing Sheets

(51) Int. Cl.
*H04W 16/28* (2009.01)
*H04W 76/19* (2018.01)
*H04B 7/08* (2006.01)
*H04B 7/06* (2006.01)

(52) U.S. Cl.
CPC ....... *H04W 16/28* (2013.01); *H04W 74/0833* (2013.01); *H04W 76/19* (2018.02)

(56) References Cited

U.S. PATENT DOCUMENTS

| | | | |
|---|---|---|---|
| 2016/0192269 A1 | 6/2016 | Kim et al. | 370/332 |
| 2019/0029049 A1* | 1/2019 | Akkarakaran | H04W 72/085 |
| 2019/0104507 A1* | 4/2019 | Majmundar | H04W 36/06 |
| 2019/0182682 A1* | 6/2019 | Kim | H04W 74/08 |
| 2019/0190582 A1* | 6/2019 | Guo | H04L 25/0226 |
| 2019/0261195 A1* | 8/2019 | Cheng | H04W 24/08 |
| 2019/0261338 A1* | 8/2019 | Akkarakaran | H04L 5/0048 |
| 2019/0327743 A1* | 10/2019 | Shi | H04L 5/0087 |
| 2020/0059398 A1* | 2/2020 | Pan | H04W 56/001 |

OTHER PUBLICATIONS

Taiwan IPO, office action for the TW patent application 108106090 (non English translation is available) dated Dec. 18, 2019 (9 pages).
R1-1705917 3GPP TSG-RAN WG1 Meeting #88bis, Ericsson, "Relation between radio link failure and beam failure", Spokane, U.S., Apr. 3-7, 2017 (4 pages) *section 2*.
R1-1800699 3GPP TSG RAN WG1 Meeting AH 1801, Ericsson, "Remaining details on beam management", Vancouver, Canada, Jan. 22-26, 2018 (6 pages) *section 2.1*.
R1-1801006 3GPP TSG RAN WG1 Meeting AH 1801, Ericsson, "Feature lead summary 1 of beam measurement and reporting", Vancouver, Canada, Jan. 22-26, 2018 (12 pages) *section 4.4*.
International Search Report and Written Opinion of International Search Authority for PCT/CN2019/075905 dated May 20, 2019 (8 pages).
R1-1716351 3GPP TSG-RAN WG1 NR Ad Hoc #3, Ericsson, "Basic beam recovery", Nagoya, Japan, Sep. 18-21, 2017 (9 pages) *pp. 1-6*.
R1-1801006 3GPP TSG RAN WG1 Meeting Ah 1801, Ericsson, "Feature lead summary 1 of beam measurement and reporting", Vancouver, Canada, Jan. 22-26, 2018 (12 pages) *pp. 4-7*.

* cited by examiner

US 10,841,926 B2

DEFAULT BEAM FOR UPLINK TRANSMISSION AFTER CONNECTION REESTABLISHMENT

CROSS REFERENCE TO RELATED APPLICATIONS

This application claims priority under 35 U.S.C. § 119 from U.S. Provisional Application No. 62/634,792, entitled "Default Beam for UL Transmission in Transition Phase," filed on Feb. 23, 2018, the subject matter of which is incorporated herein by reference.

TECHNICAL FIELD

The disclosed embodiments relate generally to wireless communication, and, more particularly, to default beam selection for uplink transmission in transition phase such as after radio resource control (RRC) reestablishment procedure.

BACKGROUND

The bandwidth shortage increasingly experienced by mobile carriers has motivated the exploration of the under-utilized Millimeter Wave (mmWave) frequency spectrum between around 30 G and 300 G Hz for the next generation broadband cellular communication networks. The available spectrum of mmWave band is hundreds of times greater than the conventional cellular system. The mmWave wireless network uses directional communications with narrow beams and can support multi-gigabit data rate. The under-utilized bandwidth of the mmWave spectrum has very small wavelengths, which enables large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

Radio link monitor (RLM) is designed to ensure proper link quality can be achieved from higher layer perspective, e.g., radio resource control (RRC) layer. RLM exists in single-beam systems such as LTE systems. Under RLM, periodic physical layer L1 indications on link quality, e.g., In-Sync and Out-of-Sync (IS/OOS) indications, are monitored. Radio link failure (RLF) can be declared upon consecutive OOS exceeds number $N_{OOS}$ and accumulative IS does not reach number $N_{IS}$ before the expiry of $T_{IS}$ timer. After RLF is declared at UE, UE triggers RRC connection re-establishment procedure and then attempts to re-establish the RRC connection via a four-step random access channel (RACH) procedure. In addition to RLF, RRC connection re-establishment can also be triggered after a handover failure, where UE is handover from a source cell to a target cell.

After RRC connection re-establishment and before the first uplink control beam indication is completed signaled from the network, UE does not know which TX beam can be used to transmit physical uplink control channel (PUCCH) when UE is required to deliver uplink control information (UCI). A solution is sought to define a default UE TX beam during such transition phase.

SUMMARY

A method of default uplink beam determination after radio resource control (RRC) connection reestablishment in a beamforming system is proposed. For uplink (UL) transmission, the BS provides dedicated physical uplink control channel (PUCCH) resource configuration to UE. The configuration includes spatial relation information that indicates the spatial domain transmission filter to be used by UE for the corresponding PUCCH transmission. After RRC connection re-establishment and before a dedicated PUCCH configuration is received, a default UE TX beam can be determined based on the UE TX beam used during the RRC connection re-establishment procedure, e.g., the UE TX beam used to transmit MSG3 in a four-step random-access channel (RACH) procedure triggered by the RRC connection re-establishment procedure.

In one embodiment, a UE initiates a radio resource control (RRC) connection reestablishment procedure in a beamforming communication network. The UE performs a random-access channel (RACH) procedure triggered by the RRC connection reestablishment procedure. The UE determines a default spatial filter for uplink transmissions based on the RACH procedure. The UE performs a subsequent physical uplink control channel (PUCCH) transmission using the default spatial filter before receiving a dedicated PUCCH configuration(s), which includes spatial relation information for the dedicated PUCCH resource(s).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
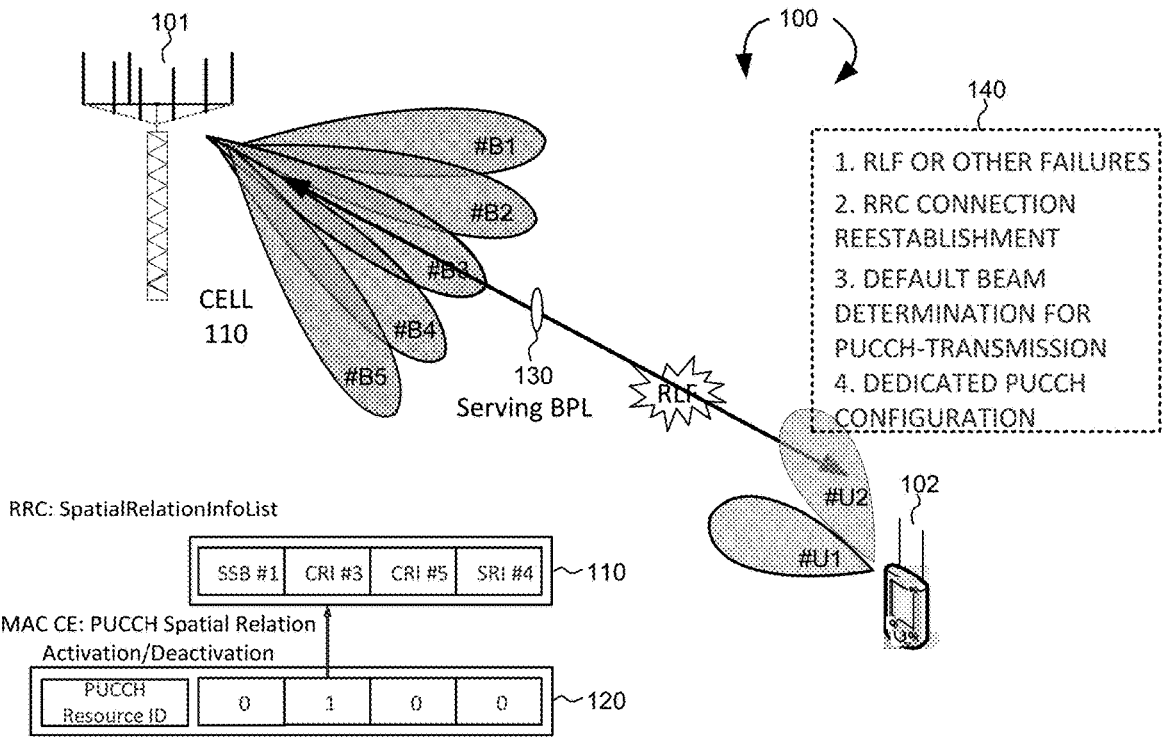
FIG. 1 illustrates a beamforming wireless communication system and default uplink beam for physical uplink control channel (PUCCH) transmission before dedicated PUCCH resource configuration in accordance with one novel aspect.

FIG. 1 illustrates a beamforming wireless communication system 100 and default uplink beam for physical uplink control channel (PUCCH) transmission before dedicated PUCCH resource configuration in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams #B1, #B2, #B3, #B4, and #B5. The collection of the BS beams #B1-#B5 covers an entire service area of cell 110. Similarly, UE 102 may also apply beamforming to form multiple UE beams, e.g., #U1, #U2. For beamformed access, both ends of a link need to know which beamformers to use, e.g., a serving beam pair link (BPL) 130 for communication between BS 101 (using #B3) and UE 102 (using #U2).

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems, or synchronization signal block (SSB) in NR systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

Beam management and beam training mechanism, which includes both initial beam alignment and subsequent beam tracking, ensures that base station (BS) beam and user equipment (UE) beam are aligned for data communication. For uplink (UL) transmission, the base station provides a dedicated physical uplink control channel (PUCCH) resource configuration(s) to UE to configure one or multiple dedicated PUCCH resources. In addition to PUCCH format, first symbol, duration, PRB offset, and cyclic shift for each dedicated PUCCH resource, the dedicated PUCCH resource configuration further comprises the spatial relation information for the dedicated PUCCH(s). The spatial relation information indicates the spatial filter (e.g., TX beam) to be used by UE for the corresponding PUCCH transmission.

As depicted in FIG. 1, a spatial relation information, e.g., a spatial relation between a spatial filter for a dedicated PUCCH resource and a spatial filter for a reference signal resource, can be indicated by radio resource control (RRC) signaling or RRC+MAC control element (CE). In one example, a SpatialRelationInfoList, which contains one or more PUCCH-SpatialRelationInfo Information Elements (IEs), is configured in a dedicated PUCCH resource configuration via RRC signaling. Each PUCCH-SpatialRelationInfo IE can include a synchronization signal block (SSB) resource indicator (SSBRI), a channel state information reference signal (CSI-RS) resource indicator (CRI), or a sounding reference signal (SRS) resource indicator (SRI), to indicate the spatial filter (e.g., the UE TX beam) to be used by UE associated to the corresponding PUCCH transmission. When the number of PUCCH-SpatialRelationInfo IEs in SpatialRelationInfoList is more than one, then a MAC CE is used to point to one of the PUCCH-SpatialRelationInfo IEs for indicating spatial relation information for a dedicated PUCCH resource. In the example of FIG. 1, the SpatialRelationInfoList 110 contains at most four PUCCH-SpatialRelationInfo IEs including SSB #1, CRI #3, CRI #5, and SRI #4. A MAC CE 120 including a four-bit bitmap and a PUCCH resource ID for PUCCH spatial relation activation, with a second bit of the bitmap having value 1, is then used to indicate that UE 102 can assume a spatial relation between a spatial filter for CRI #3 and a spatial filter for UE PUCCH transmission on a dedicated PUCCH resource indicated by the PUCCH resource ID.

Radio link monitor (RLM) is designed to ensure proper link quality can be achieved from higher layer perspective, e.g., radio resource control (RRC) layer. RLM exists in single-beam systems such as LTE system. Under RLM, periodic physical layer L1 indications on link quality, e.g., In-Sync and Out-of-Sync (IS/OOS) indications, are monitored. Radio link failure (RLF) will be declared upon consecutive OOS exceeds number $N_{OOS}$ and accumulative IS does not reach number $N_{IS}$ before the expiry of $T_{IS}$ timer. After RLF is declared at UE, UE initiates an RRC connection re-establishment procedure and then attempts to re-establish the RRC connection via a four-step random access channel (RACH) procedure. In addition to RLF, there are many reasons to initiate an RRC connection re-establishment procedure in new radio (NR) systems. For example, an RRC connection reestablishment procedure can be initiated after a re-configuration with sync failure, a mobility from NR failure, and an RRC connection reconfiguration failure.

From RRC connection re-establishment procedure is initiated to a dedicated PUCCH resource configuration(s) is provided from the BS, there is no dedicated PUCCH resource for UE to deliver uplink control information. During such transition phase, the BS provides a common PUCCH resource configuration to UE, using System Information Block (SIB), during the RRC connection re-establishment procedure, to configure a set of common PUCCH resources, with each corresponding PUCCH format, first symbol, duration, PRB offset, and cyclic shift. However, the UE still does not know which spatial filter or TX beam can be used to transmit the common PUCCH when UE is required to deliver uplink control information (UCI). In accordance with one novel aspect, a default UE TX beam can be determined based on the UE TX beam used during the RRC connection re-establishment procedure, e.g., the UE TX beam used to transmit MSG3 in a four-step random-access channel (RACH) procedure triggered by the RRC connection re-establishment. As depicted by 140, RLF or other failure is detected (step 1), RRC connection reestablishment procedure is initiated (step 2), a default TX beam is then determined for PUCCH transmission (step 3) before the UE receives a dedicated PUCCH configuration (step 4).

Figure 2:
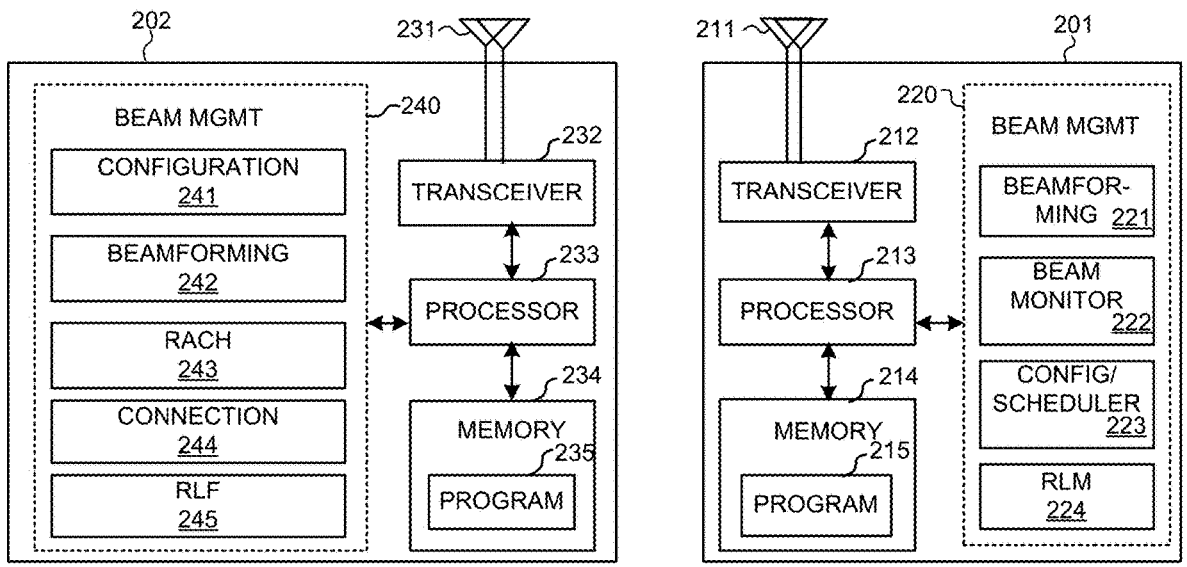
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a link quality management module 220, which further comprises a beamforming circuit 221, a beam monitor 222, a config and scheduling circuit 223, and an RLM handling circuit 224. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Config and scheduling circuit 223 schedules uplink transmission for UEs and configures radio resources for UEs for uplink transmission. It also provides spatial relation information for uplink transmission. RLM handling circuit performs physical layer radio link monitor functionality.

Similarly, UE 202 comprises a link quality management module 240, which further comprises a configuration circuit 241, a beamforming circuit 242, a RACH handling circuit 243, a connection handling circuit 244, and an RLF detecting circuit 245. Configuration circuit 241 receives configuration information from the serving BS via RRC signaling and/or MAC CE. The configuration information may comprise PUCCH resource and spatial relation information for UL control beam indication. Beamforming circuit 242 may belong to part of the RF chain, which applies various beamforming weights to multiple antenna elements of antenna 231 and thereby forming various beams based on the UL control beam indication from the network. Beamforming circuit 242 also determines default UE TX beam during transition phase, e.g., from RRC connection re-establishment procedure is initiated to a dedicated PUCCH resource configuration(s) is provided. RACH handling circuit 243 performs four-step RACH procedure. Connection handling circuit 244 handles the establishment and re-establishment of RRC connection. RLF detecting circuit 245 performs radio link monitor functionality to detect RLF.

Figure 3:
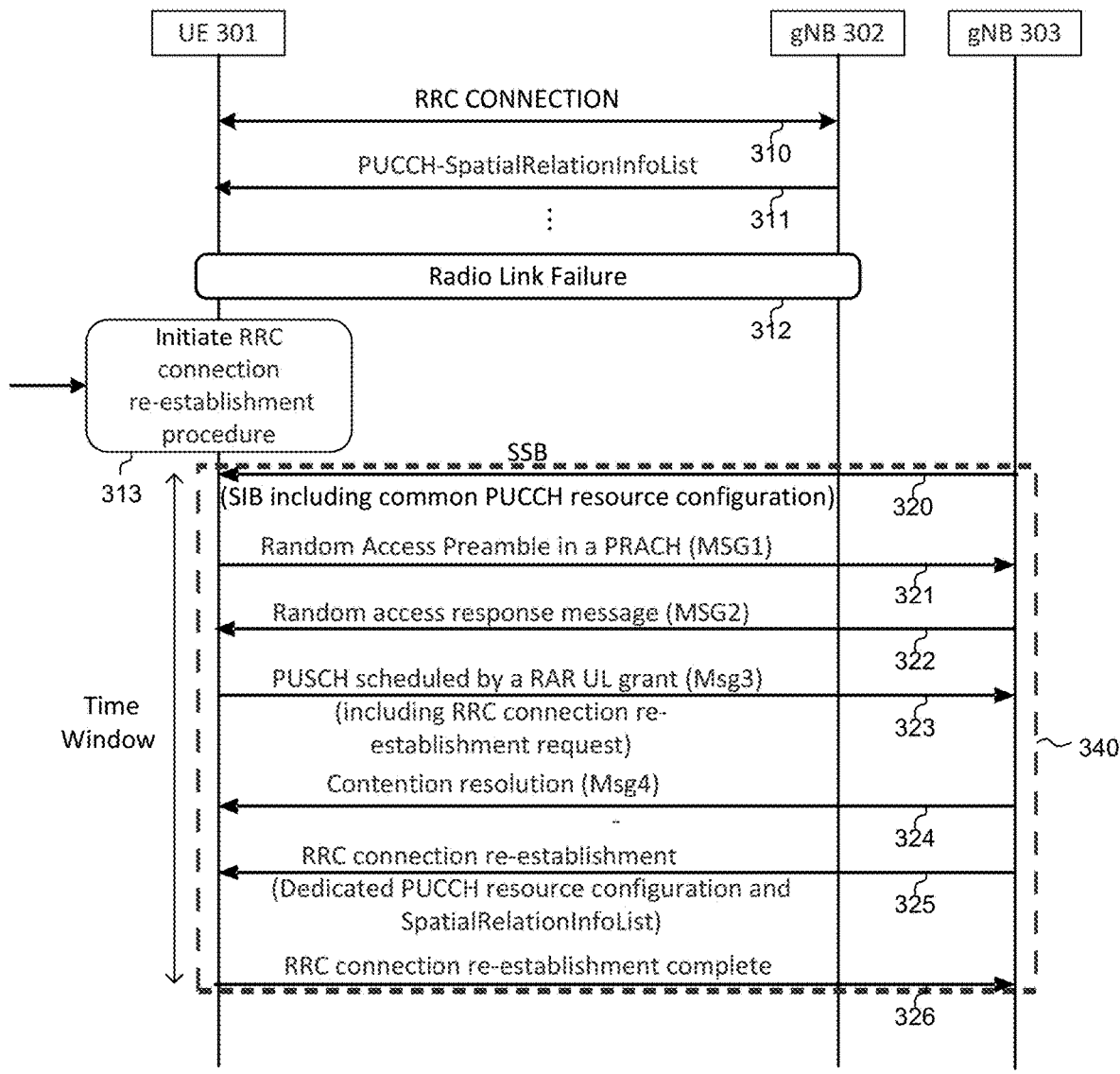
FIG. 3 illustrates one embodiment of an RRC connection reestablishment procedure triggered by RLF and default UL beam determination.

FIG. 3 illustrates one embodiment of an RRC connection reestablishment procedure initiated by RLF, and default UL beam (or spatial filter) determination for PUCCH transmission. In step 310, UE 301 is served by next generation base station gNB 302 and establishes an RRC connection for data communication. In step 311, UE 301 may receive dedicated PUCCH resource configuration (e.g., including SpatialRelationInfoList) from gNB 302 for uplink transmission. Later on, in step 312, UE 301 declares a radio link failure (RLF). UE 301 then initiates an RRC connection re-establishment procedure in step 313. Note that RLF is just illustrated as an example, there are many reasons to initiate an RRC connection re-establishment procedure in NR systems.

The RRC connection re-establishment procedure includes cell search and cell selection, and 4-step RACH procedure. During cell search and cell selection, the detection of at least one valid SSB transmitted from gNB 303 indicates a new cell is successfully acquired (step 320). In the acquired SSB transmitted from gNB 303, UE 301 can receive SIB corresponding to the acquired SSB, which includes a common PUCCH resource configuration. UE 301 then attempts to re-establish the RRC connection via triggering a 4-step RACH procedure (e.g., MSG1, MSG2, MSG3, and MSG4) (step 313) on the acquired SSB. The 4-step RACH procedure can be similar to the 4-step RACH procedure used for initial access, although the associated RRC messages in MSG3 and MSG4 can be different.

In step 321, UE 301 transmits a random-access preamble (MSG1) over a Physical Random-Access Channel (PRACH). UE 301 can choose a spatial filter to transmit the random-access preamble according to previous measurements on the acquired SSB. In step 322, UE 301 receives a random-access response (RAR) uplink grant from MSG2 transmitted from gNB 303. The successful reception of the RAR indicates that at least one UL beam pair link and a least one DL beam pair link are identified at both UE 301 and gNB 303. In step 323, UE 301 transmits uplink data (MSG3) over a PUSCH scheduled by the RAR uplink grant. MSG3 includes an RRC connection re-establishment request. MSG3 is transmitted based on the UL beam pair link identified in step 322. Note that the UE beam utilized for MSG1 and MSG3 can be the same or can be different. In step 324, UE 301 receives a contention resolution (MSG4) from gNB 303. In step 325, UE 301 receives an RRC connection re-establishment message from gNB 303. Optionally, MSG4 can include the RRC connection reestablishment message (step 324 and step 325 are combined into one step). In the RRC connection re-establishment message, a dedicated PUCCH resource configuration(s) and corresponding SpatialRelationInfoList(s) can be provided. In step 326, UE 301 transmits an RRC connection re-establishment complete message to gNB 303 if the RRC connection re-establishment message is successfully received, and the RRC connection re-establishment procedure is completed.

Note that from RRC connection re-establishment procedure is initiated to a dedicated PUCCH resource configuration(s) is provided to UE, UE does NOT know which UL beam should be used when UE is required to do PUCCH transmission on e.g., the common PUCCH resource(s). In one novel aspect, during a time window 340 of the RRC connection re-establishment procedure, UE 301 can use a default UE spatial domain transmission filter (e.g., a default UE TX beam) to transmit PUCCH. In one preferred embodiment, the default UE TX beam is the same as the one used for transmitting MSG3 in step 323 of the RACH procedure. As depicted by time window 340, the time window starts when UE initiates the RRC connection re-establishment procedure and ends at the a dedicated PUCCH resource configuration(s) and corresponding spatial relation information are provided to UE 301 by gNB 303. In one specific example, UE 301 needs to transmit an HARQ ACK/NACK feedback to gNB 303 in response to the received contention resolution of MSG4, and UE 301 can use the default UE TX beam for such UL transmission during the time window 340.

Figure 4:
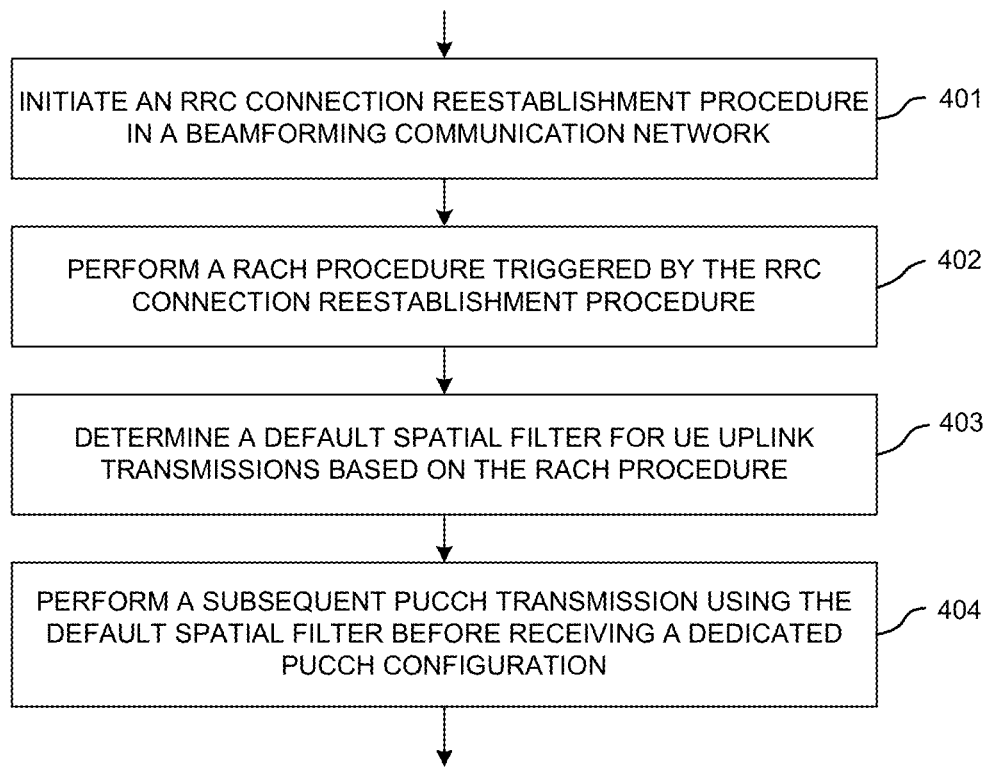
FIG. 4 is a flow chart of a method of default UL beam determination after RRC connection reestablishment in a beamforming system in accordance with one novel aspect.

FIG. 4 is a flow chart of a method of default UL beam determination during RRC connection reestablishment procedure in a beamforming system in accordance with one novel aspect. In step 401, a UE initiates a radio resource control (RRC) connection reestablishment procedure in a beamforming communication network. In step 402, the UE performs a random-access channel (RACH) procedure triggered by the RRC connection reestablishment procedure. In step 403, the UE determines a default spatial filter for uplink transmissions based on the RACH procedure. In step 404, the UE performs a subsequent physical uplink control channel (PUCCH) transmission using the default spatial filter before receiving a dedicated PUCCH configuration(s), which includes spatial relation information for the dedicated PUCCH resource(s).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   initiating a radio resource control (RRC) connection reestablishment procedure by a user equipment (UE) in a beamforming communication network;
   performing a random-access channel (RACH) procedure triggered by the RRC connection reestablishment procedure;
   determining a default spatial filter for UE uplink transmissions based on the RACH procedure, wherein the RACH procedure comprises the UE transmitting an RRC connection re-establishment request to the base station using a spatial filter; and
   performing a subsequent physical uplink control channel (PUCCH) transmission using the default spatial filter before receiving a dedicated PUCCH configuration, wherein the spatial filter is determined as the default spatial filter for the subsequent PUCCH transmission.

2. The method of claim 1, wherein the RACH procedure comprises the UE transmitting a random-access preamble using a spatial filter derived based on previous measurements on an acquired synchronization signal block (SSB).

3. The method of claim 1, wherein the RACH procedure comprises the UE receiving a random-access response containing an uplink grant.

4. The method of claim 1, wherein the default spatial filter is used during a time window from UE initiating an RRC connection reestablishment procedure to UE receiving the dedicated PUCCH configuration.

5. The method of claim 4, wherein the subsequent PUCCH transmission involves UE transmitting an ACK/NACK in response to a contention resolution from the BS during the RACH procedure.

6. The method of claim 1, wherein the RRC connection reestablishment procedure is initiated due to a radio link failure (RLF) detection.

7. The method of claim 1, wherein the dedicated PUCCH configuration comprises spatial relation information for the dedicated PUCCH resource(s).

8. The method of claim 7, wherein the spatial relation information is provided via RRC and/or MAC control element (CE) signaling.

9. A User Equipment (UE), comprising:
   a radio resource control (RRC) connection handling circuit that initiates an RRC connection reestablishment procedure in a beamforming communication network;
   a random-access channel (RACH) handling circuit that performs a RACH procedure triggered by the RRC connection reestablishment procedure;
   a beamforming circuit that determines a default spatial filter for UE uplink transmissions based on the RACH procedure, wherein the RACH procedure comprises the UE transmitting an RRC connection re-establishment request to the base station using a spatial filter; and
   a transmitter that performs a subsequent physical uplink control channel (PUCCH) transmission using the default spatial filter before receiving a dedicated PUCCH configuration, wherein the spatial filter is determined as the default spatial filter for the subsequent PUCCH transmission.

10. The UE of claim 9, wherein the RACH procedure comprises the UE transmitting a random-access preamble using a spatial filter based on previous measurements on an acquired synchronization signal block (SSB).

11. The UE of claim 9, wherein the RACH procedure comprises the UE receiving a random-access response containing an uplink grant.

12. The UE of claim 9, wherein the default spatial filter is used during a time window from UE initiating an RRC connection reestablishment procedure to UE receiving the dedicated PUCCH configuration.

13. The UE of claim 12, wherein the subsequent PUCCH transmission involves UE transmitting an ACK/NACK in response to a contention resolution from the BS during the RACH procedure.

14. The UE of claim 9, wherein the RRC connection reestablishment procedure is initiated due to a radio link failure (RLF) detection.

15. The UE of claim 9, wherein the dedicated PUCCH configuration comprises spatial relation information for the dedicated PUCCH resource(s).

16. The UE of claim 15, wherein the spatial relation information is provided via RRC and/or MAC control element (CE) signaling.

* * * * *